Sept. 20, 1960 A. FROHLICH ET AL 2,953,183
PNEUMATIC TIRE
Filed April 19, 1956 2 Sheets-Sheet 1
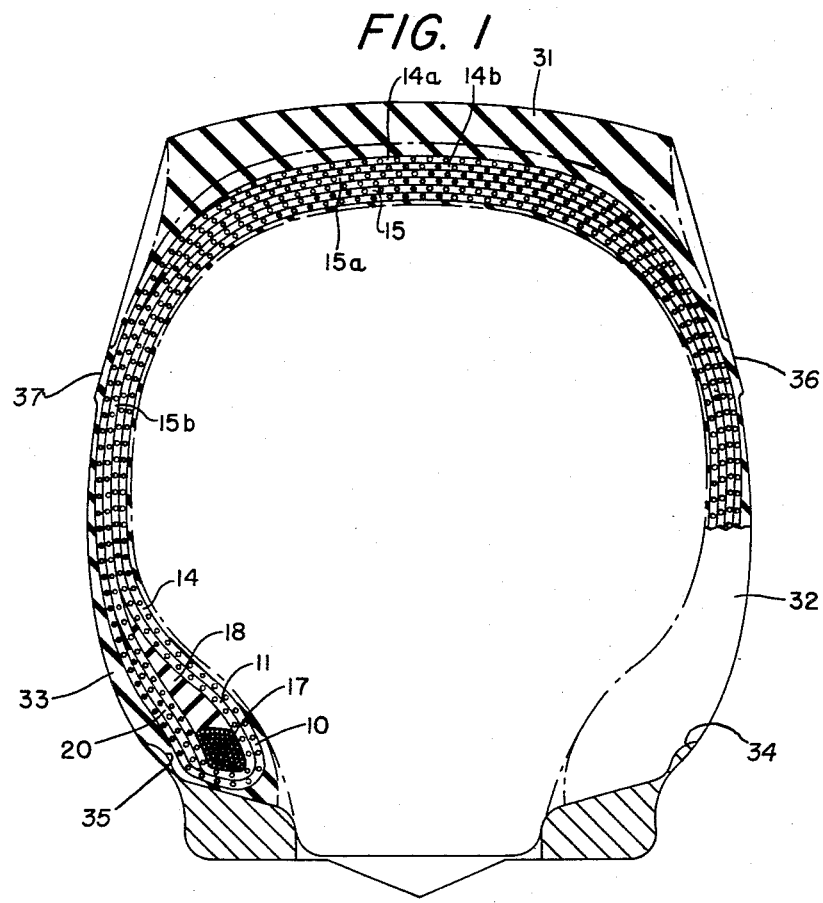
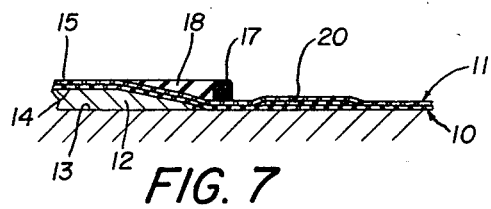
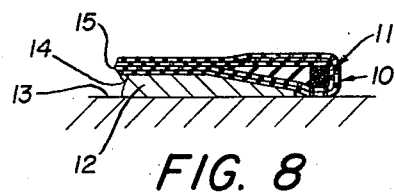
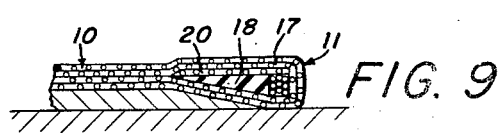
INVENTORS
ADOLF FROHLICH &
BY EDWARD J. HARRIS
ATTORNEY

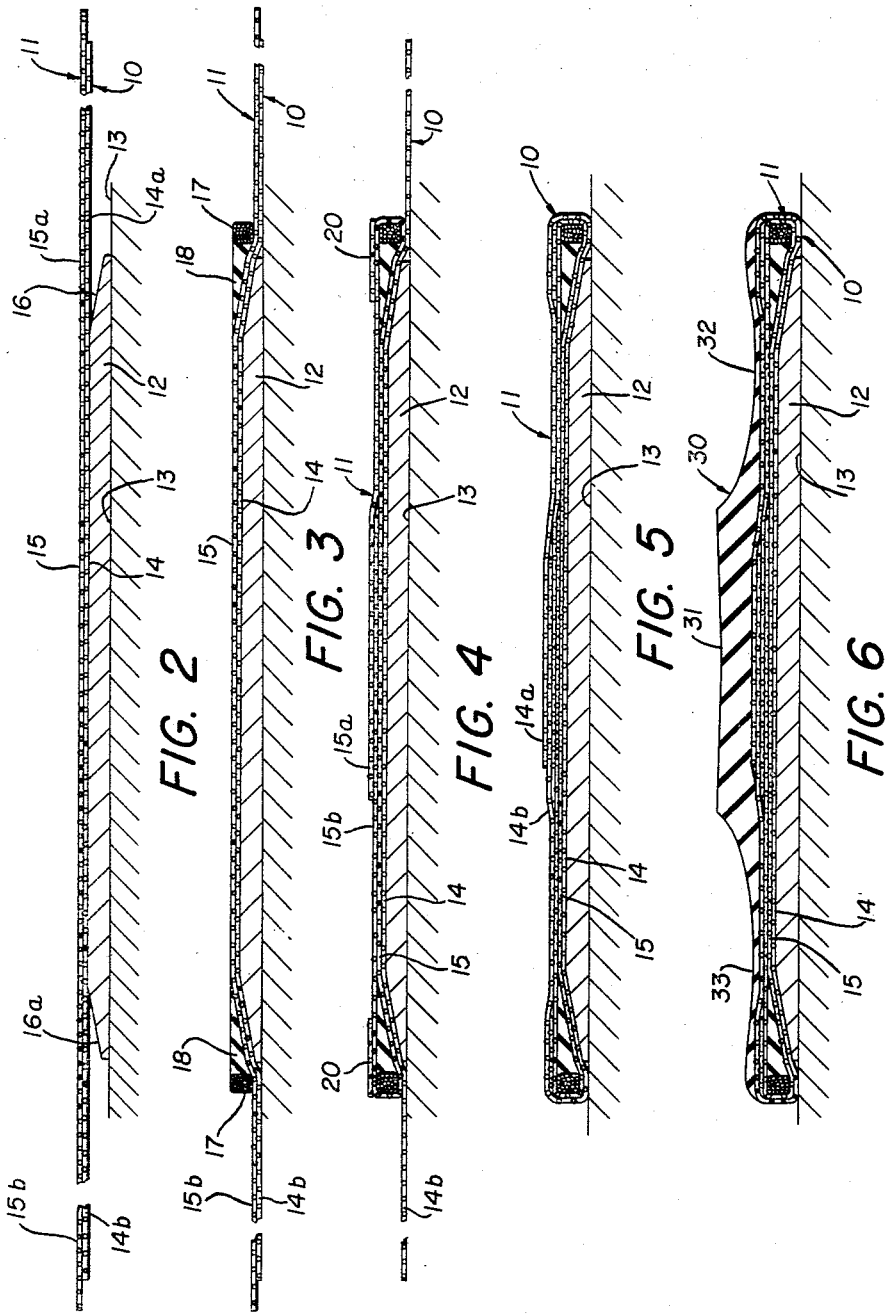

United States Patent Office 2,953,183
Patented Sept. 20, 1960

2,953,183
PNEUMATIC TIRE

Adolf Frohlich and Edward J. Harris, Akron, Ohio, assignors to The Cleveland Trust Company, Cleveland, Ohio, as trustee Filed Apr. 19, 1956, Ser. No. 579,403

6 Claims. (Cl. 152—354)

This invention relates to the field of pneumatic tires, and in particular has reference to a pneumatic tire having wire cord or other high strength cord members provided therein.

In the past pneumatic tires have generally utilized a fabric cord member therein for the purpose of providing overall strength to the tire carcass. It is believed axiomatic at the present time that the load bearing properties of pneumatic tires of this type as well as the operating life thereof are proportionate to the strength of the cord members employed thereon.

It is well established, for example, that tire failure such as blowouts, etc., can normally be traced to the cord members in the ruptured area. It follows that increased cord strength would result in the production of a tire that has a greater load resistance as well as longer wearing properties. It has been found that if wire cord members are employed, for example, in the fabric plies used in the manufacture of pneumatic tires, that several distinct advantages will be gained. First, the number of plies employed can be materially reduced, in view of the fact that each ply will have a considerably greater strength than plies presently employed in the known prior art. Secondly, in the case of construction of heavy-duty tires such as truck tires, the number of beads employed can be reduced so that the overall building of these tires is simplified. Third, because of the inherent strength of such fabric plies, it has been found that if the fabric plies are made wider than normal, the free edges that extend beyond the bead portions can be turned over, with such turnover flap position serving to eliminate the need for the conventional breaker and chafer strips now employed in pneumatic tires.

To the present time, difficulty has been encountered in experimentation relating to the use of wire cord members. One of the prime difficulties encountered is related to the difficulty in effectuating a turnover. Other difficulties along this line have been encountered. Additionally, the prior art at the present time has not contemplated the formation of a complete pneumatic tire from fabric plies and tread stock alone, it being customary practice at the present time to still employ the breaker and chafer strips of long standing in the prior art.

It has been discovered that an improved type of pneumatic tire can be made having as primary constituents thereof fabric plies with wire cords, and interwoven filler strip and the usual tread stock.

It has further been found that if fabric plies having a greater width are used that the free ends that project beyond the respective bead portions can be turned over alternately so as to be interlaced in the area normally occupied by the breaker strip, with the result that this interlacing of fabric plies serves to relieve the need for additional breaker strips.

It accordingly becomes a principal object of this invention to provide an improved type of pneumatic tire utilizing fabric plies having wire cords.

It is a further object of this invention to provide an improved pneumatic tire that has the edge portions of the fabric ply interlaced together in the crown region of the tire so as to provide additional strength at this point.

It is a still further object of this invention to provide a pneumatic tire having a minimum number of component parts that results in the production of a pneumatic tire of simplified construction and relatively light weight, with the result that such a tire will be long lasting and operate at low temperatures.

These and other objects of the invention will become more apparent upon a reading of the following brief specification considered and interpreted in the light of the accompanying drawings.

Of the drawings:

Figure 1 is an enlarged cross-section through an improved tire of the invention.

Figures 2 through 6 are schematic views showing the improved pneumatic tire at various stages of construction.

Figures 7 and 8 are fragmentary sections of a modified form of the invention.

Figure 9 is a fragmentary section of a modified form of the invention.

The detail construction of the tire can best be understood by following the step-by-step method of building the same as is shown in Figures 2 through 6 of the drawings.

Accordingly, as set forth in Figure 2, a pair of fabric plies 10 and 11 are shown positioned about a cylindrical sleeve 12 that is shiftable axially with respect to a building drum 13 of known construction and having a fixed diameter.

As best shown in Figure 2 the plies 10 and 11 have medial portions 14 and 15, and spaced overhanging edge portions 14a, 14b and 15a, 15b; with the edge portions 15a, 15b slightly overhanging the edge portions 14a, 14b. It will be noted from Figure 2 that the sleeve 12 has tapered axial edges 16, 16a, upon which may be received the fabric ply 10 when beads 17, 17 are positioned thereagainst as shown in Figure 3 of the drawings, with wedge shaped rubber portions 18, 18 of the beads being spaced with regard to the surfaces 16, 16a by the medial portions 14 and 15 of fabric plies 10 and 11, respectively.

At such time as the component parts are positioned as shown in Figure 3 of the drawings, it is apparent that the outermost fabric ply 11 may have the edge portions 15a, 15b thereof alternately folded about beads 17, 17 so that these edge portions become positioned as shown in Figure 4 of the drawings; with edge portion 15b being folded over first in the preferred embodiment of the invention described herein. By this alternate fold-over of the edge portions 15a and 15b, it will be seen that the outermost portion of the edge portion 15a overlies the previously turned over edge portion 15b so that in effect, the edge portion 15b is interlaced between folded-over edge portion 15a, and the medial portion 15 of fabric ply 11.

At this time, a flexible filler strip 20 may be positioned over the turned-over edge portions 15a and 15b, as best shown in Figure 4, with two such filler strips 20, 20 being employed and each including an annular ring of wire fabric. It is to be understood that similar filler strips could be supplied having either square woven or diagonally disposed cord members therein.

Upon positioning of the filler strips 20, 20 in the region of the beads 17, 17 as just described, the remaining edge portions 14a and 14b are alternately turned over, with the edge portion 14b being shown turned over first in the preferred embodiment set forth in Figure 5 of the drawings.

The remaining component part of the pneumatic tire is shown in Figure 6 of the drawings and comprises a tread 30 having a thickened central portion 31 together with wide wall portions 32 and 33; the arrangement being such that the extreme outboard end of the side wall portion 32 overlies bead 17, and turned over edge portions 14a and 15a; while the extreme outboard edge of the side wall portion 33 overlies the opposite bead 17 as clearly set forth in Figure 6 of the drawings.

As best shown in the cross-sectional view of Figure 1, the outer surface of edge portion 32 is provided with circumferentially extending grooves 34, 35, respectively, in the region of the bead area thereof; the arrangement being such that the use of such grooves permits the improved tire to be used without the aid of an innertube, with the interaction of such grooves with the rim forming an air lock therebetween. In addition to the aforementioned component parts the side wall portions 32 and 33 of the tread are shown provided with raised circumferential protuberances 36, 37, respectively, that are utilized for known purposes in this regard.

It will be seen from the foregoing that there has been provided a new and novel type of pneumatic tire, characterized by the fact that the extreme edge portions thereof are interlaced in the crown area of the tire so as to replace the usual breaker strip employed in this region. It is further apparent that this interlacing operates to greatly add additional strength in this critical region of the tire, and in effect provides a layer of steel immediately underneath the crown portion of the tread itself. It has been shown how the filler strip is employed or interwoven adjacent the bead areas of the tire so as to provide a maximum degree of strength in this critical area.

The modified form of the invention shown in Figures 7 and 8 of the drawings is similar in many respects to that shown in Figures 1 through 6, with the single exception that the filler strip 20 is shown pre-set between the plies 10 and 11 so that the two edge portions 14a, 15a, can be folded over in one operation. In this manner the filler 20 will be set as shown in Figure 8 after the turn-over operation, while the edge portions will be interlaced as before. Similarly, if desired, the filler strips 20, 20 could be applied directly on beads 17, 17 if desired prior to turn-over operation as shown in Figure 9.

In this specification, it is to be understood that the bias angle is not critical, and accordingly, the invention contemplates an indefinite range of bias angles within its scope.

While a detailed recitation of construction, composition and configuration has been set forth in the preceding paragraphs in accordance with the requirements of the patent statutes, it is to be understood that the size, composition, and configuration of the above described component parts could be altered without modifying the invention.

It accordingly follows that modifications of the invention may be resorted to without departing from the spirit hereof or the scope of the appended claims.

What is claimed is:

1. A pneumatic tire of flat built uncured configuration, comprising; a first ply having the opposed edge portions thereof folded over axially spaced bead rings so as to overlap medially of said uncured tire; a pair of thin axially spaced filler strips, superimposed over the radially outermost portion of said folded over portion of said first ply, with one axial edge of each said strip being disposed adjacent the outermost axial portions of said tire in the region of said bead rings; a second ply constituting an inner liner for said uncured tire body and having the edge portions thereof folded over said bead rings and overlapping medially of said uncured tire, whereby said filler strips are encased between said first and said second plies in the region of said bead rings; and tread stock superimposed over said folded over edge portions of said second ply; said tread, both said plies and said filler strips being of annular configuration.

2. The device of claim 1 further characterized by the fact that said cord members of at least one said ply are metallic.

3. The device of claim 1 further characterized by the fact that said filler strips have metallic cords provided therein.

4. The device of claim 1 further characterized by the fact that said fabric plies are of unequal axial width.

5. A method of building a pneumatic tire on a building drum that includes a telescoping axially shiftable liner carried by said building drum, comprising the steps of; applying a first and second ply about the exterior of said drum in overlapping relationship to said liner; applying bead rings over both said plies and moving the same into position adjacent the edge portions of said plies; alternately folding the opposed edge portions of said second applied ply about said bead rings, whereby the same overlap medially of said tire; applying thin axially spaced filler strips of annular configuration upon the radially outermost portion of said folded over portion of said first ply, with said strips being applied so that one axial edge portion thereof is disposed adjacent the outermost axial edge portions of said tire in the region of said bead rings; alternately folding the opposed edges of said first applied ply about said bead rings, whereby said filler strips are encased between said first and second plies in the region of said bead ring; and applying a tread stock about said folded over fabric plies.

6. A pneumatic tire of flat built uncured configuration, comprising; a first ply having the opposed edge portions thereof folded over axially spaced bead rings so as to overlap medially of said uncured tire; a second ply constituting an inner liner for said uncured tire body and having the edge portions thereof folded over said bead rings and overlapping medially of said uncured tire body, whereby said bead and said first folded over ply are encased by said second folded over ply; tread stock superimposed over the folded over edge portions of said second ply; and a pair of filler strips applied on the radially outermost exterior surfaces of said folded over portion of said first ply; one of said pair of filler strips being confined to each bead region thereof, whereby said filler strip and said first ply increase the spacing between said bead and said second ply; said tread, both said plies and said filler strips being of annular configuration.

References Cited in the file of this patent

UNITED STATES PATENTS

| | | |
|---|---|---|
| 1,493,674 | Hopkinson | May 13, 1924 |
| 1,807,909 | Gammeter | June 2, 1931 |
| 2,501,372 | Benson | Mar. 21, 1950 |
| 2,752,980 | Riggs | July 13, 1956 |